United States Patent
Oonuki

(10) Patent No.: US 9,590,905 B2
(45) Date of Patent: Mar. 7, 2017

(54) CONTROL APPARATUS AND A COMMUNICATION METHOD, APPARATUS, AND SYSTEM TO PERFORM PATH CONTROL OF A NETWORK

(71) Applicant: Satoshi Oonuki, Tokyo (JP)

(72) Inventor: Satoshi Oonuki, Tokyo (JP)

(73) Assignee: NEC Corporation, Tokyo (JP)

( * ) Notice: Subject to any disclaimer, the term of this patent is extended or adjusted under 35 U.S.C. 154(b) by 23 days.

(21) Appl. No.: 14/384,144

(22) PCT Filed: Mar. 22, 2013

(86) PCT No.: PCT/JP2013/058231
§ 371 (c)(1),
(2) Date: Sep. 9, 2014

(87) PCT Pub. No.: WO2013/141340
PCT Pub. Date: Sep. 26, 2013

(65) Prior Publication Data
US 2015/0043586 A1    Feb. 12, 2015

(30) Foreign Application Priority Data
Mar. 23, 2012  (JP) ................................ 2012-067043

(51) Int. Cl.
*H04L 12/28*      (2006.01)
*H04L 12/741*     (2013.01)
(Continued)

(52) U.S. Cl.
CPC .......... *H04L 45/745* (2013.01); *H04L 47/125* (2013.01); *H04L 69/22* (2013.01); *H04L 61/103* (2013.01); *H04L 67/2861* (2013.01)

(58) Field of Classification Search
CPC ..... H04L 45/745; H04L 45/64; H04L 47/125; H04L 69/22; H04L 61/103
See application file for complete search history.

(56) References Cited

U.S. PATENT DOCUMENTS 7,478,425 B2    1/2009  Kanno et al.
8,503,307 B2 *  8/2013  Tourrilhes ........... H04L 41/0816
                                                        370/230
(Continued)

FOREIGN PATENT DOCUMENTS

JP    2003-173300 A    6/2003
JP    2004-342041 A   12/2004
(Continued)

OTHER PUBLICATIONS

European Search Report dated Sep. 22, 2015.
(Continued)

*Primary Examiner* — Abdelnabi Musa
(74) *Attorney, Agent, or Firm* — McGinn IP Law Group, PLLC

(57) ABSTRACT

A control apparatus connected to a communication apparatus(es) that processes received packets in accordance with control information includes a control information generation unit generating control information to be set in the communication apparatus(es) and a communication apparatus control unit setting the generated control information in the communication apparatus(es). This control apparatus sets proxy-response control information in the communication apparatus(es), the proxy-response control information defining a processing content(s) for causing the communication apparatus(es), when the communication apparatus(es) receives a certain packet, to generate a response packet for the certain packet and to transmit the response packet to a source of the certain packet.

8 Claims, 12 Drawing Sheets

(51) Int. Cl.
*H04L 29/06* (2006.01)
*H04L 12/803* (2013.01)
*H04L 29/12* (2006.01)
*H04L 29/08* (2006.01)

(56) References Cited

U.S. PATENT DOCUMENTS

| | | | | |
|---|---|---|---|---|
| 8,923,296 | B2* | 12/2014 | Liljenstolpe | H04L 61/103 370/392 |
| 2003/0061306 | A1 | 3/2003 | Kanno et al. | |
| 2004/0120279 | A1* | 6/2004 | Huckins | H04L 29/12009 370/328 |
| 2011/0317559 | A1* | 12/2011 | Kern | H04L 45/02 370/235 |
| 2012/0303835 | A1* | 11/2012 | Kempf | H04W 24/02 709/235 |
| 2013/0034104 | A1* | 2/2013 | Yedavalli | H04L 41/12 370/400 |
| 2013/0176850 | A1* | 7/2013 | Mishra | H04L 49/00 370/235 |
| 2013/0223444 | A1* | 8/2013 | Liljenstolpe | H04L 61/103 370/392 |

FOREIGN PATENT DOCUMENTS

| | | |
|---|---|---|
| JP | 2008-60747 A | 3/2008 |
| JP | 2011-14964 A | 1/2011 |
| JP | 2011-188433 A | 9/2011 |
| WO | WO 2012/033041 A1 | 3/2012 |
| WO | WO 2012/033117 A1 | 3/2012 |

OTHER PUBLICATIONS

Japanese Office Action dated Aug. 13, 2015 with a partial English translation thereof.
International Search Report (ISR) (PCT Form PCT/ISA/210), in PCT/JP2013/058231, dated May 14, 2013.
Nick McKeown, and seven others, "OpenFlow: Enabling Innovation in Campus Networks", [online], [searched on Feb. 14, 2012], Internet <URL: http://www.openflow.org/documents/openflow-wp-latest.pdf>.
"OpenFlow Switch Specification" Version 1.1.0 Implemented (Wire Protocol 0x02), [online], [searched on Feb. 14, 2012], Internet <URL:http://www.openflow.org/documents/openflow-spec-v1.1.0.pdf>.

* cited by examiner

FIG.10

| Set VLAN ID | Set VLAN priority | Strip VLAN header | Modify Ethernet src MAC address | Modify Ethernet dst MAC address | Modify IPv4 src address | Modify IPv4 dst address | Modify IPv4 ToS bits | Modify transport src port | Modify transport dst port |
|---|---|---|---|---|---|---|---|---|---|

CONTROL APPARATUS AND A COMMUNICATION METHOD, APPARATUS, AND SYSTEM TO PERFORM PATH CONTROL OF A NETWORK

REFERENCE TO RELATED APPLICATION

The present invention is based upon and claims the benefit of the priority of Japanese patent application No. 2012-067043, filed on Mar. 23, 2012, the disclosure of which is incorporated herein in its entirety by reference thereto.

The present invention relates to a control apparatus, a communication apparatus, a communication system, a communication method, and a program. In particular, it relates to: a control apparatus that controls a communication apparatus by setting control information in the communication apparatus; a communication apparatus; a communication system; a communication method; and a program.

BACKGROUND

Conventional network apparatuses are "black boxes" on which flexible control such as load balancing and aggregation cannot be performed from the outside. For this reason, the larger a network becomes, the more difficult it becomes to grasp and improve the behavior of the network as a system. Thus, when the design or configuration of the network is changed, much delay is caused, which is counted as a problem.

To solve this problem, there has been considered a method of separating functions of packet forwarding and path control that conventional network apparatuses perform. For example, by causing a network apparatus to perform packet forwarding and a controller arranged outside the network apparatus to perform path control, external control can easily be performed. Namely, a flexible network can be established.

As a specific example of the above method, OpenFlow in Non-Patent Literature 1 and 2 will be described. OpenFlow is an architecture defined in "Open Networking Foundation".

FIG. 9 illustrates a basic configuration of OpenFlow 1.1.0. In FIG. 9, a switch is illustrated as a network apparatus. OpenFlow includes a network apparatus (a switch X20) supporting the OpenFlow protocol described in Non-Patent Literature 2 and an externally-arranged controller X10. The network apparatus and the controller are connected with each other via a secure channel and communicate with each other by using the OpenFlow protocol. In OpenFlow, packet forwarding and path control functions of a network apparatus are separated. More specifically, the network apparatus (the switch X20) performs packet forwarding and the controller X10 performs path control of the network apparatus.

The network apparatus supporting OpenFlow includes a table which is referred to as a flow table and which stores control information. The flow table is a table for managing entries. In each of these entries, header region information (Header Field) of a packet defined as belonging to a flow and an instruction defining a processing content(s) for the packet are associated with each other. A set of the header region information (Header Field; also referred to as Match Fields) and the instruction is referred to as a flow entry.

A matching condition(s) for determining processing target packets is written in the header region information (Header Field). A wildcard can also be specified in a part in the header region information (Header Field). The processing content(s), such as forwarding processing for forwarding packets to other network apparatuses and dropping processing for dropping packets, are written in the instruction field.

Other processing than the above forwarding and dropping processing may be written as an action in the instruction field. For example, an action for causing the network apparatus to modify a value in the header region information (Header Field) of a packet can also be specified. A plurality of actions may be set in a single flow entry. The network apparatus checks the header region information (Header Field) of a received packet against the header region information (Header Field) in the flow table. As a result of this checking processing, if any matching entry is found, a corresponding action(s) in the instruction field is performed.

Information that could be used as items of the header region information (Header Field) will be described with reference to FIG. 9. In FIG. 9, "Ingress Port", "Ether src", "Ether dst", "Ether type", "VLAN ID", "VLAN priority", "IP src", "IP dst", "IP proto", "IP ToS", "TCP/UDP src port", and "TCP/UDP dst port" are illustrated as the information that could be used as items of the header region information (Header Field). At least one of the above information items is used when a packet is checked against the flow entries. Namely, at least one of or a combination of the above information items is used to define a flow.

"Ingress Port" represents an ingress port. "Ether src" represents a source MAC address (Media Access Control Address). "Ether dst" represents a destination MAC address. "Ether type" represents an upper-layer protocol type. "VLAN ID" represents identification information set for each port of a virtual LAN (Virtual Local Area Network) switch. "VLAN priority" represents a priority of a corresponding port of a virtual LAN switch. "IP src" represents a source IP address (Internet Protocol Address). "IP dst" represents a destination IP address. "IP proto" represents an IP protocol number or an ARP operation code. "IP ToS" represents an IP priority. "TCP/UDP src port" represents a source port number in TCP (Transmission Control Protocol) or UDP (User Datagram Protocol). "TCP/UDP dst port" represents a destination port number in TCP or UDP.

Next, header rewrite actions (set-Field Actions) for modifying header region information (Header Field) of a packet will be described with reference to FIG. 10. These actions can be set in the instruction field in a flow entry. In FIG. 10, "Set VLAN ID", "Set VLAN priority", "Strip VLAN header", "Modify Ethernet src MAC address", "Modify Ethernet dst MAC address", "Modify IPv4 src address", "Modify IPv4 dst address", "Modify IPv4 ToS bits", "Modify transport src port", and "Modify transport dst port" are illustrated as the header rewrite actions (Action) that can be set in a flow entry. A plurality of these actions can be performed in combination.

"Set VLAN ID" represents adding "VLAN ID" to the header region information (Header Field) or modifying "VLAN ID" in the header region information (Header Field). "Set VLAN priority" represents adding "VLAN priority" to the header region information (Header Field) or modifying "VLAN priority" in the header region information (Header Field). "Strip VLAN header" represents deleting "VLAN ID" and "VLAN priority" from the header region information (Header Field). "Modify Ethernet src MAC address" represents modifying "Ether src" in the header region information (Header Field). "Modify Ethernet dst MAC address" represents modifying "Ether dst" in the header region information (Header Field). "Modify IPv4 src address" represents modifying "IP src" in the header region information (Header Field). "Modify IPv4 dst address" represents modifying "IP dst" in the header region information (Header Field). "Modify IPv4 ToS bits" represents modifying "IP ToS" in the header region information (Header Field). "Modify transport src port" represents modifying "TCP/UDP src port" in the header region information (Header Field). "Modify transport dst port" represents modifying "TCP/UDP dst port" in the header region information (Header Field). "Ethernet" is a registered mark.

The controller X10 includes a network apparatus control unit (a switch control unit X11 in FIG. 9), updates a flow table in the network apparatus via the secure channel, and controls the network apparatus (the switch X20).

The network apparatus (the switch X20) includes a packet control unit X21 performing packet forwarding and packet updating in accordance with the above flow entries. When receiving a packet, the network apparatus checks the packet against a flow table X22 therein. If the flow table X22 includes a matching flow entry, the network apparatus performs an associated action(s) such as packet forwarding and dropping.

Next, a basic operation of the network apparatus (the switch X20) in OpenFlow will be described with reference to FIG. 11. When receiving a packet from a network (step S11 in FIG. 11), the network apparatus (the switch X20) analyzes the header region information (Header Field) of the received packet (step S12 in FIG. 11).

The network apparatus (the switch X20) determines whether the flow table includes a flow entry that matches the header region information (Header Field) of the received packet (step S13 in FIG. 11).

If the flow table includes a flow entry that matches the header region information (Header Field) of the received packet, the network apparatus (the switch X20) performs an action(s) written in the instruction field in the flow entry (step S14 in FIG. 11).

If the flow table does not include a flow entry that matches the header region information (Header Field) of the received packet, the network apparatus (the switch X20) holds the packet therein and notifies the controller X10 of arrival of this unknown packet by transmitting the packet to the controller X10 via the secure channel (step S15 in FIG. 11). In this description, the unknown packet that does not match any flow entry is referred to as a 1st packet.

When receiving the 1st packet, the controller calculates a path to a destination of the 1st packet on the basis of a location of a source of the 1st packet and information included in the 1st packet, adds a new flow entry to the flow table of the network apparatus (the switch X20), and updates the flow table. After the flow table is updated, the network apparatus processes the 1st packet that has been held therein and subsequent packets of the same kind in accordance with the newly added action.

In addition, Patent Literature 1 discloses a communication system using OpenFlow. In addition, Patent Literature 2 discloses a layer-2 load balancer that is arranged between a group of clients and a group of servers and that performs MAC address conversion and proxy response.

Patent Literature 1
Japanese Patent Kokai Publication No. 2011-188433A
Patent Literature 2
Japanese Patent Kokai Publication No. 2008-60747A
Non-Patent Literature 1
Nick McKeown, and seven others, "OpenFlow: Enabling Innovation in Campus Networks", [online], [searched on Feb. 14, 2012], Non-Patent Literature 2
"OpenFlow Switch Specification": Version 1.1.0 Implemented (Wire Protocol 0x02), [online], [searched on Feb. 14, 2012]

SUMMARY

Technical Problem

The following analysis has been given by the present inventor. As illustrated in s21 to s24 in FIG. 12, if the 1st packet received from a network apparatus represents a MAC address and an IP address of the controller X10, the controller X10 generates a response packet for the received packet and transmits the response packet to the network apparatus. The network apparatus transmits the response packet received from the controller to a destination node.

Consequently, if the network apparatus (for example, a network apparatus A in FIG. 12) receives a large number of packets addressed to the controller, since all these packets are transmitted to the controller X10, the load on the controller and the secure channel is increased. As a result, the overall system performance is deteriorated, counted as a problem.

The above phenomenon could also occur not only when a large number of 1st packets are addressed to the controller but also when a large number of packets are transmitted to a server or the like connected to the network apparatus within a short period of time.

There is a need in the art to contribute to suppression of performance deterioration, which is caused in a control apparatus in a centralized-control-type network such as the controller in the above OpenFlow by a concentration of packets to the controller.

According to a first aspect, there is provided a control apparatus, comprising: a control information generation unit generating control information to be set in a communication apparatus(es) that processes received packets in accordance with the control information; and a communication apparatus control unit setting the generated control information in the communication apparatus(es); wherein the control apparatus sets proxy-response control information in the communication apparatus(es), the proxy-response control information defining a processing content(s) for causing the communication apparatus(es), when the communication apparatus(es) receives a certain (specified) packet, to generate a response packet for the certain packet and to transmit the response packet to a source of the certain packet.

According to a second aspect, there is provided a communication apparatus, which is connected to a control apparatus(es) comprising: a control information generation unit generating control information to be set in the communication apparatus; and a communication apparatus control unit setting the generated control information in the communication apparatus and setting proxy-response control information in the communication apparatus, the proxy-response control information defining a processing content(s) for causing the communication apparatus, when the communication apparatus receives a certain (specified) packet, to generate a response packet for the certain packet and to transmit the response packet to a source of the certain packet and which generates and transmits a response packet in accordance with the proxy-response control information set by the control apparatus(es).

According to a third aspect, there is provided a communication system comprising: a control apparatus(es) comprising a control information generation unit generating control information to be set in a communication apparatus(es) that processes received packets in accordance with the control information and a communication apparatus control unit setting the generated control information in the communication apparatus(es) and setting proxy-response control information in the communication apparatus(es), the proxy-response control information defining a processing content(s) for causing the communication apparatus(es), when the communication apparatus(es) receives a certain (specified) packet, to generate a response packet for the certain packet and to transmit the response packet to a source of the certain packet; and a communication apparatus(es) generating and transmitting a response packet in accordance with the proxy-response control information set by the control apparatus(es).

According to a fourth aspect, there is provided a communication method comprising: causing a control apparatus(es), comprising: a control information generation unit generating control information to be set in a communication apparatus(es) that processes received packets in accordance with the control information; and a communication apparatus control unit setting the generated control information in the communication apparatus(es), to set proxy-response control information in the communication apparatus(es), the proxy-response control information defining a processing content(s) for causing the communication apparatus(es), when the communication apparatus(es) receives a (specified) certain packet, to generate a response packet for the certain packet and to transmit the response packet to a source of the certain packet; and causing the control apparatus(es) to cause the communication apparatus(es) to generate and transmit the response packet in accordance with the proxy-response control information set by the control apparatus(es). This method is associated with a certain machine(s), namely, with a control apparatus(es) controlling a communication apparatus(es) on a network.

According to a fifth aspect there is provided a program, causing a computer, which is mounted on a control apparatus(es) comprising: a control information generation unit generating control information to be set in a communication apparatus(es) that processes received packets in accordance with the control information; and a communication apparatus control unit setting the generated control information in the communication apparatus(es), to perform processing for: generating proxy-response control information defining a processing content(s) for causing the communication apparatus(es), when the communication apparatus(es) receives a certain (specified) packet, to generate a response packet for the certain packet and to transmit the response packet to a source of the certain packet; and setting the generated control information in the communication apparatus(es). This program can be recorded in a computer-readable (non-transient) storage medium. Namely, the present invention can be embodied as a computer program product.

The present invention can contribute to suppression of performance deterioration caused by a concentration of packets to a control apparatus in a centralized-control-type network.

BRIEF DESCRIPTION OF THE DRAWINGS

FIG. 10 illustrates a list of header rewrite actions (Set-Field Actions) in the OpenFlow network according to Non-Patent Literatures 1 and 2 for describing packet rewrite actions.

PREFERRED MODES

Figure 1:
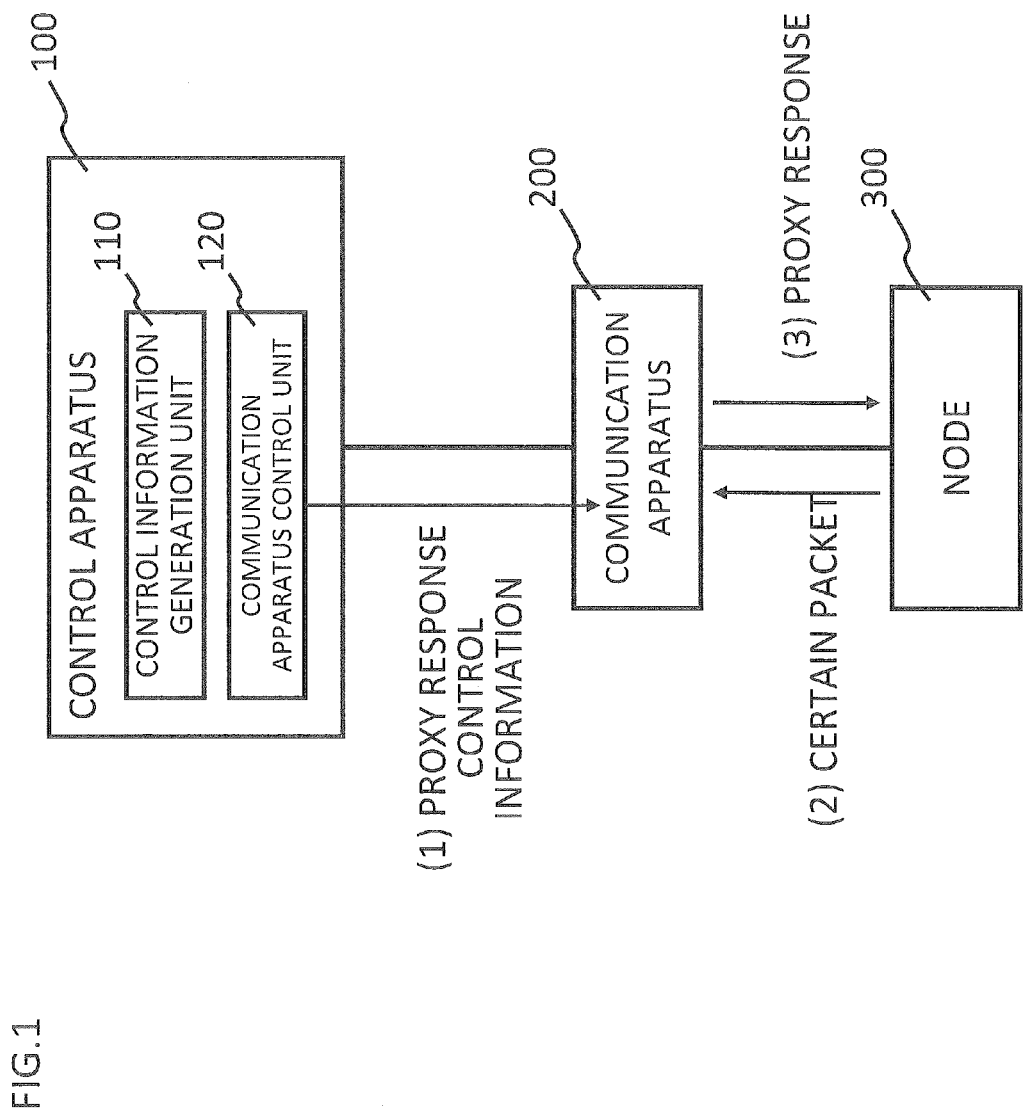
FIG. 1 illustrates a configuration according to an exemplary embodiment of the present invention.

In the present disclosure, there are various possible modes, which include the following, but not restricted thereto. First, an outline of an exemplary embodiment of the present invention will be described with reference to the drawings. In the following outline, various components are denoted by reference characters for the sake of convenience. Namely, the following reference characters are merely used as examples to facilitate understanding of the present invention, not to limit the present invention to the illustrated modes.

As illustrated in FIG. 1, an exemplary embodiment of the present invention can be realized by a configuration in which a control apparatus 100 and a communication apparatus 200 are connected with each other. The control apparatus 100 includes a control information generation unit 110 generating control information to be set in a communication apparatus and a communication apparatus control unit 120 setting the generated control information in the communication apparatus. The communication apparatus 200 processes packets in accordance with the control information set by the control apparatus.

More specifically, the control apparatus 100 sets proxy-response control information in the communication apparatus 200, the proxy-response control information defining a processing content(s) for causing the communication apparatus 200, when the communication apparatus 200 receives a certain packet, to generate a response packet for the certain packet and to transmit the response packet to the source of the certain packet. Accordingly, when receiving the certain packet, the communication apparatus 200 generates and transmits a response packet in accordance with the proxy-response control information.

For example, as illustrated in FIG. 1, the control apparatus 100 previously sets control information (proxy-response control information) in the communication apparatus 200, the control information defining a processing content(s) for causing the communication apparatus 200, when the communication apparatus 200 receives a packet (a certain packet) from a node 300, to generate a response packet for the certain packet and to transmit the response packet to the source of the certain packet ((1) PROXY-RESPONSE CONTROL INFORMATION).

When receiving the certain packet defined by the proxy-response control information from the node 300 ((2) CERTAIN PACKET), the communication apparatus 200 generates a response packet in accordance with the proxy-response control information and transmits the response packet to the source of the certain packet ((3) PROXY RESPONSE).

As described above, when receiving a new packet, the communication apparatus 200 can transmit a response packet in place of the control apparatus 100. Thus, the load on the control apparatus 100 can be reduced. In addition, the amount of traffic through the channel between the communication apparatus 200 and the control apparatus 100 can be reduced.

[First Exemplary Embodiment]

Figure 2:
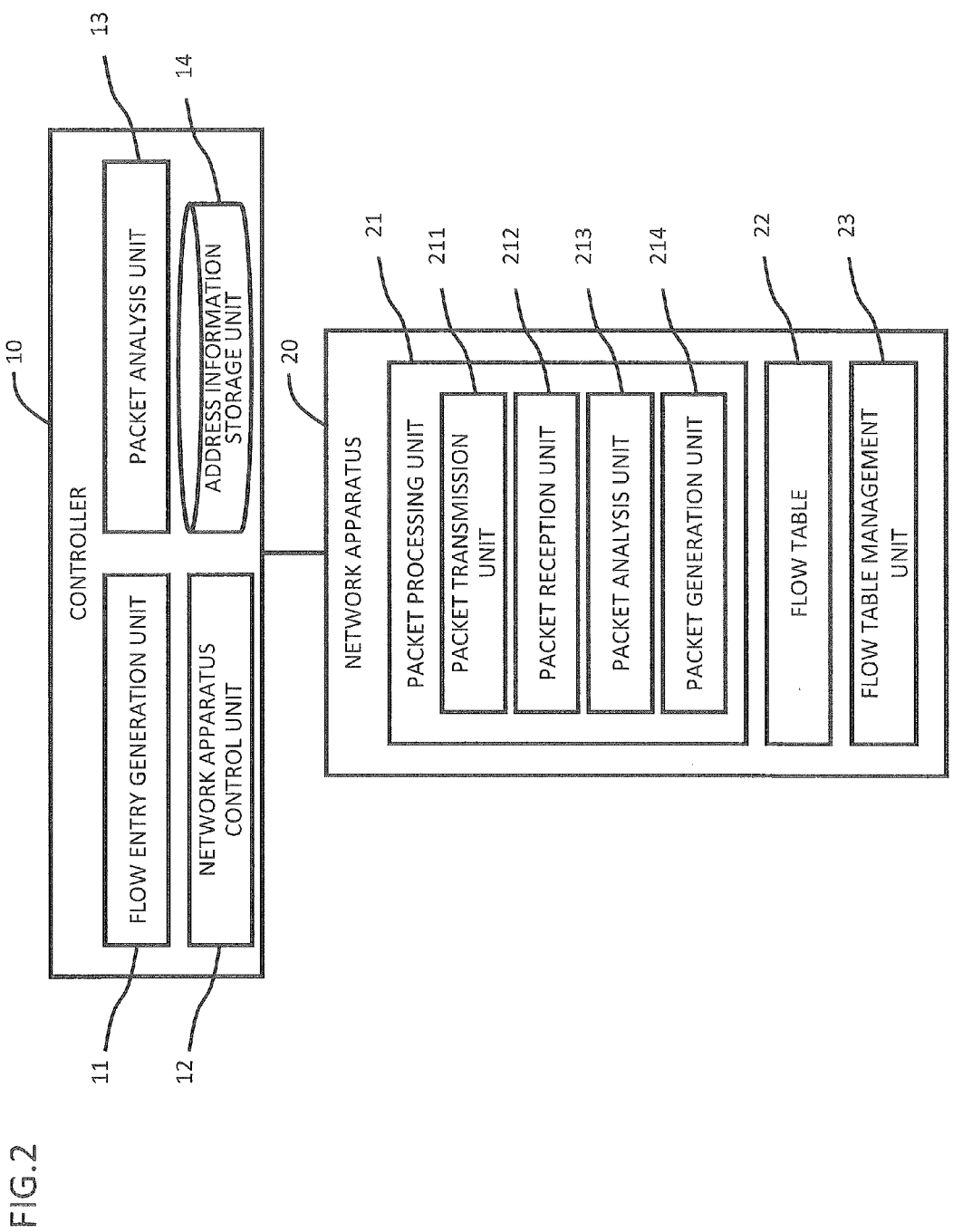
FIG. 2 illustrates a configuration of a communication system according to a first exemplary embodiment of the present invention.

Next, a first exemplary embodiment of the present invention will be described in detail with reference to the drawings. FIG. 2 illustrates a configuration of a communication system according to the first exemplary embodiment of the present invention. As illustrated in FIG. 2, a communication system including a controller 10 corresponding to the above control apparatus and a network apparatus 20 is disclosed. In the example in FIG. 2, a single controller 10 and a single network apparatus 20 are illustrated. However, an arbitrary number of controllers 10 and of network apparatuses 20 can be arranged.

The controller 10 is a server machine that is physically separated from the network apparatus 20 or a virtual machine that operates on the server machine. The controller 10 can manage a plurality of network apparatuses and is connected to each of the network apparatuses by a dedicated line or a secure channel using a normal network. The controller 10 uses the OpenFlow protocol to communicate with the network apparatuses.

The controller 10 includes a flow entry generation unit 11, a network apparatus control unit 12, a packet analysis unit 13, and an address information storage unit 14.

The flow entry generation unit 11 generates a flow entry to be set in the network apparatus 20 upon request from the network apparatus 20. If a packet, for which the network apparatus 20 has made a request, satisfies a certain condition, the flow entry generation unit 11 generates a proxy-response flow entry for causing the network apparatus 20 to generate and transmit a packet. The flow entry generation unit 11 corresponds to the above control information generation unit 110.

In the present exemplary embodiment, as a flow entry action type, a packet generation action for causing the network apparatus 20 to generate and transmit a packet is newly prepared. Alternatively, such a new action can be added as a variation (a vendor-defined action) of the header rewrite actions (Set-Field Actions) in Non-Patent Literature 2.

Figure 3:
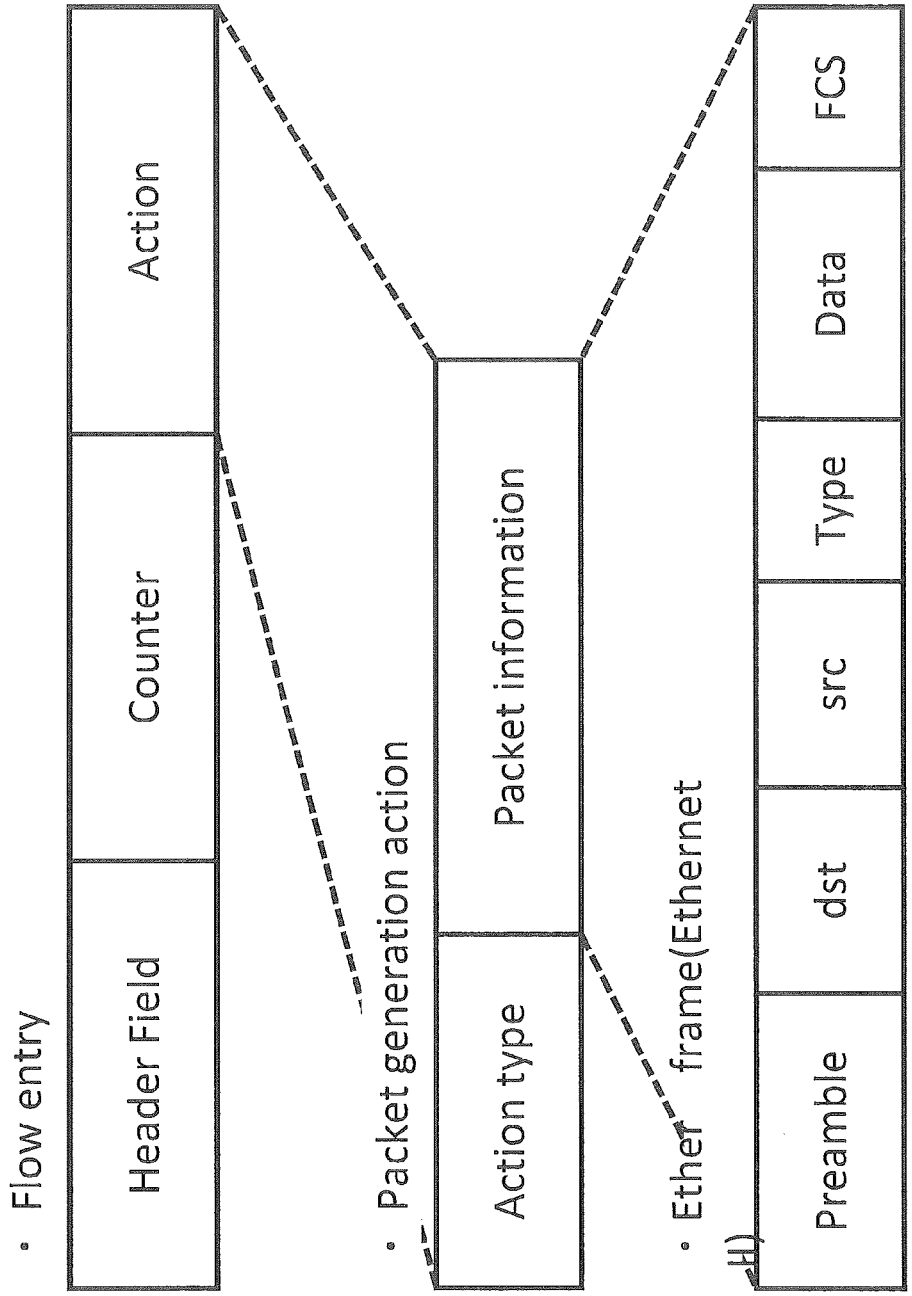
FIG. 3 illustrates a format of a proxy-response flow entry generated by a controller according to the first exemplary embodiment of the present invention.

FIG. 3 illustrates a format of a flow entry in which the packet generation action is set. As illustrated in FIG. 3, the packet generation action includes an action type representing generation of a packet and information about the packet to be generated. The information about the packet to be generated uses an Ethernet II frame format and includes regions such as a preamble, dst (a destination address), src (a source address), Type (a type), Data, and FCS (a Frame Check Sequence).

Figure 4:
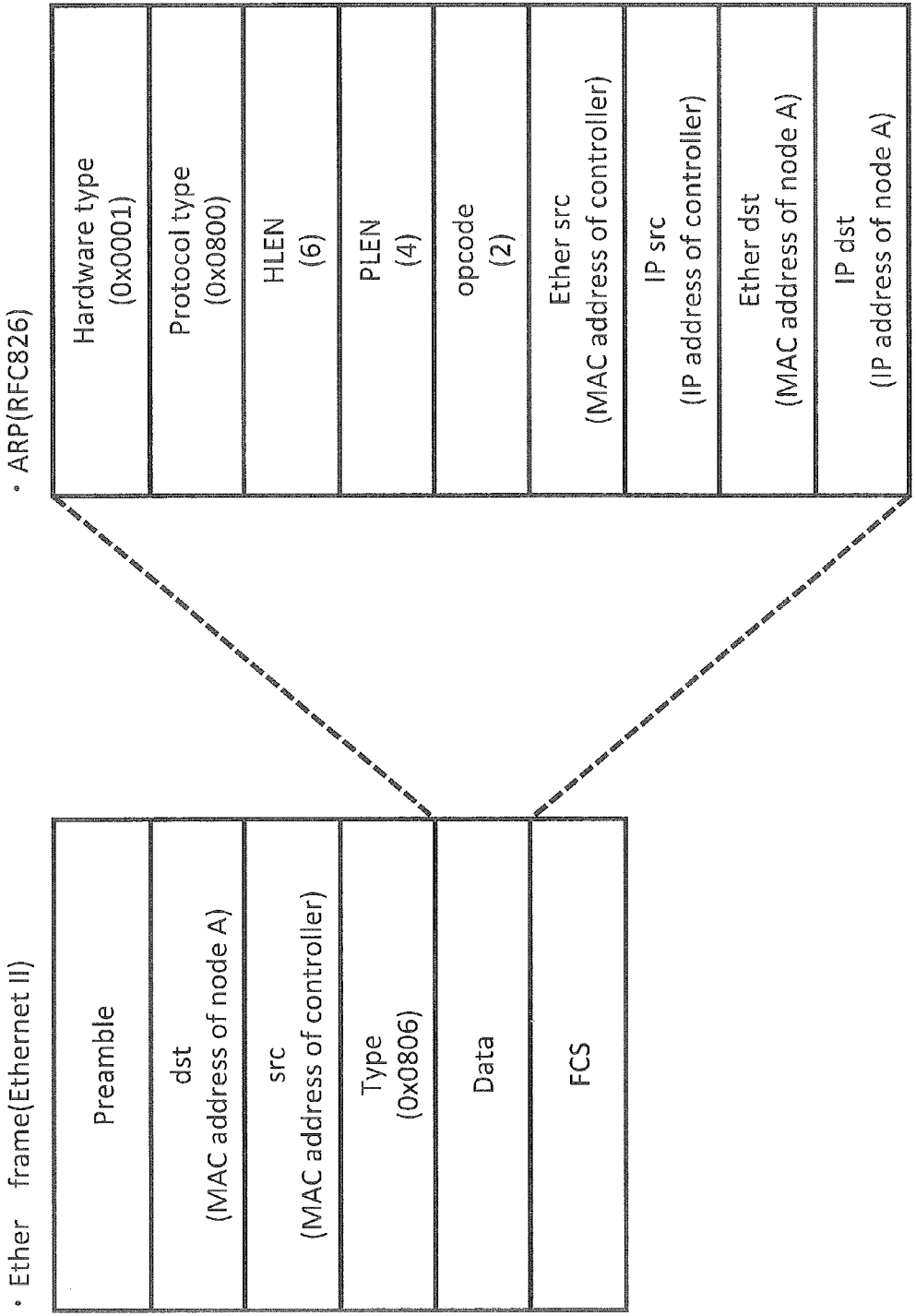
FIG. 4 illustrates a frame format of a packet generated by the flow entry in FIG. 3.

The following description will be made assuming that an ARP (Address Resolution Protocol) response packet in the frame format illustrated in FIG. 4 is generated. In the ARP response packet, 2 (=ARP response packet) is set in the "opcode" field. In order to transmit the ARP response packet in place of the controller 10, a MAC address and an IP address of the controller are set in "Ether src" and "IP src", respectively. A MAC address and an IP address of a node (for example, a node A) that has transmitted a request using an ARP packet are stored in "Ether dst" and "IP dst", respectively. This set of the MAC address and the IP address of the node (for example, the node A) can be acquired from the address information storage unit 14.

In addition, in the present exemplary embodiment, the flow entry generation unit 11 sets "Ether dst" and "IP dst" of the node (for example, the node A) that has transmitted the ARP packet in the header field of a flow entry as illustrated in FIG. 3 by referring to the MAC addresses and the IP addresses stored in the address information storage unit 14. In addition, the flow entry generation unit 11 generates a flow entry that can determine the source that has transmitted the packet (the certain packet) on which the above packet generation action is performed.

For example, the network apparatus control unit 12 sets, updates, and deletes flow entries generated by the flow entry generation unit 11 via the above secure channel. Namely, the network apparatus control unit 12 controls the network apparatus 20. The network apparatus control unit 12 corresponds to the above communication apparatus control unit 120.

The packet analysis unit 13 analyzes a packet received from the network apparatus 20, acquires a set of a source MAC address and a source IP address, and registers the set in the address information storage unit.

The address information storage unit 14 stores sets of MAC addresses and IP addresses of nodes connected to the network apparatus 20, including those of the controller 10.

The network apparatus 20 is an apparatus such as a network switch, including a packet processing unit 21, a flow table 22, and a flow table management unit 23.

The packet processing unit 21 searches the flow table for a flow entry that matches a received packet and processing the packet.

The flow table 22 corresponds to the flow table in Non-Patent Literature 2 and is used for managing flow entries. Packet forwarding, dropping, etc. are performed with the flow table 22.

The flow table management unit 23 adds, updates, and deletes flow entries transmitted from the controller 10 in the flow table 22.

The packet processing unit 21 according to the present exemplary embodiment further includes a packet transmission unit 211, a packet reception unit 212, a packet analysis unit 213, and a packet generation unit 214.

The packet transmission unit 211 transmits packets to physical ports of the network apparatus 20 and to a port connected to the controller 10. The physical ports of the network apparatus 20 are connected to a node illustrated in FIG. 6 and to other network apparatuses.

The packet reception unit 212 receives packets from the physical ports of the network apparatus 20 and the controller 10.

The packet analysis unit 213 analyzes a received packet and searching the flow table 22 for a flow entry having a matching condition(s) that matches header information or the like of the received packet.

The packet generation unit 214 generates a packet in accordance with an action stored in the instruction field of the flow entry found by the packet analysis unit 213.

In addition, the controller 10 and the network apparatus 20 illustrated in FIG. 2 can be realized by adding the functions corresponding to the flow entry generation unit 11, the packet analysis unit 13, the address information storage unit 14, and the packet generation unit 214 to the OpenFlow controller and the OpenFlow switch in Non-Patent Literatures 1 and 2. These processing unit can also be realized by computer programs that cause computers mounted on the controller 10 and the network apparatus 20 to use hardware thereof and to perform the respective processes.

Figure 5:
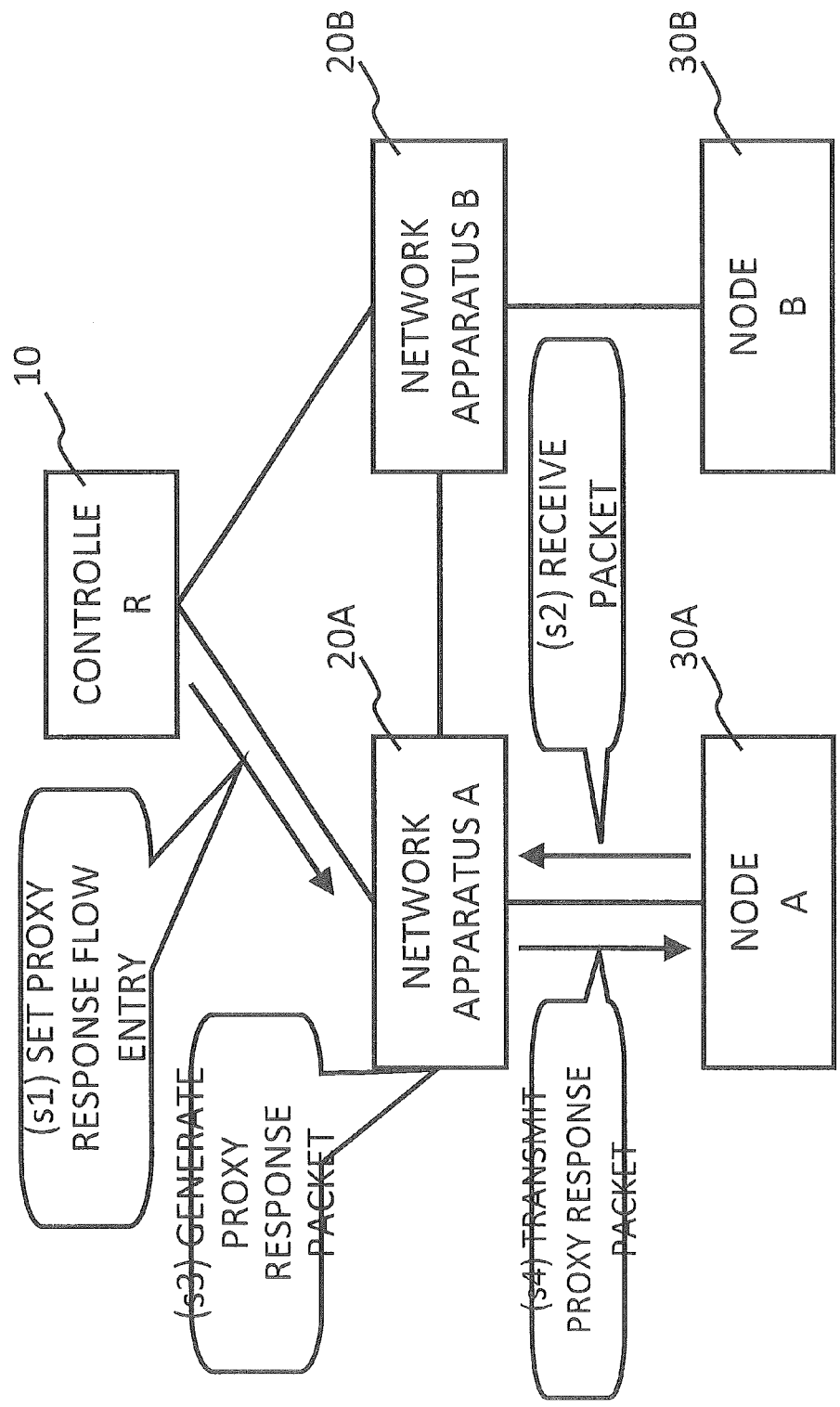
FIG. 5 illustrates a processing flow in the communication system according to the first exemplary embodiment of the present invention.

Next, an operation according to the present exemplary embodiment will be described in detail with reference to the drawings. As illustrated in FIG. 5, the following description will be made assuming that two network apparatuses 20A and 20B are connected to the controller 10 and that nodes 30A and 30B are connected to the network apparatuses 20A and 20B, respectively.

Figure 6:
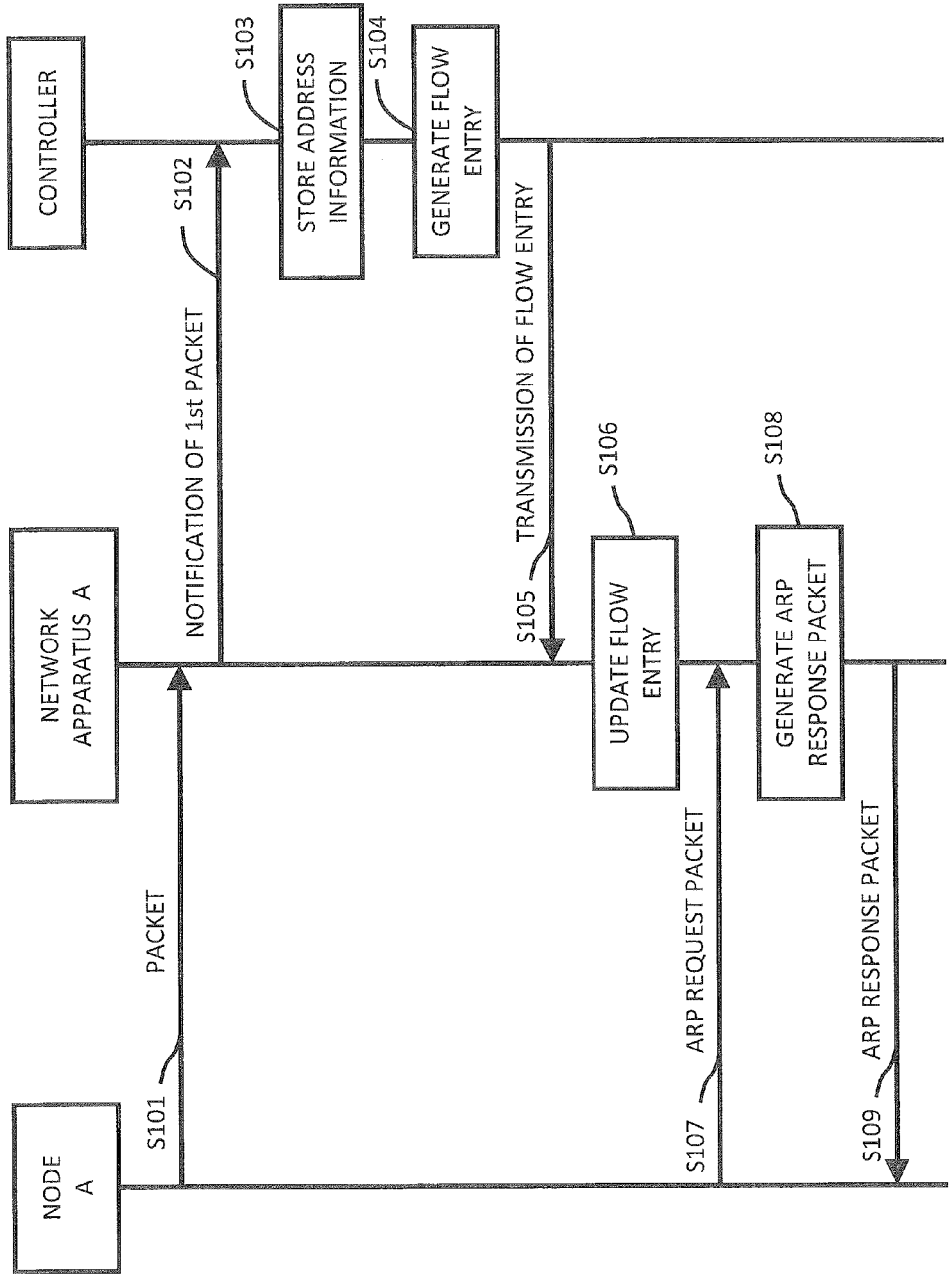
FIG. 6 is a sequence diagram illustrating an operation of the communication system according to the first exemplary embodiment of the present invention.

FIG. 6 is a sequence diagram illustrating an operation of the communication system according to the first exemplary embodiment of the present invention. As illustrated in FIG. 6, the node 30A transmits a packet in which "Ether src" represents a MAC address of the node 30A and "IP src" represents an IP address of the node 30A to the network apparatus 20A (this packet does not need to be an ARP packet) (step S101 in FIG. 6).

The packet reception unit 212 of the network apparatus 20A receives the packet transmitted by the node 30A. The packet analysis unit 213 searches the flow table 22 for a flow entry that matches the header region information (Header Field) of the received packet. If the flow table 22 does not include a matching flow entry, the packet transmission unit 211 transmits the received packet to the controller 10 as a 1st packet (step S102 in FIG. 6).

The network apparatus control unit 12 of the controller 10 receives the 1st packet from the network apparatus 20A. The packet analysis unit 13 analyzes the 1st packet and stores the set of the MAC address and the IP address written in "Ether src" and "IP src" of the 1st packet in the address information storage unit 14 (step S103 in FIG. 6).

The controller 10 performs path calculation processing and flow entry setting processing on the basis of the 1st packet, in the same way as the OpenFlow controller in Non-Patent Literatures 1 and 2. Next, the flow entry generation unit 11 refers to the MAC addresses and the IP addresses stored in the address information storage unit 14 and generates a flow entry in which header region information (matching conditions) and a packet generation action are associated with each other. In this case, in the header region information, "Ether src" represents the MAC address of the node A, "Ether type" represents 0x0806, "IP src" represents the IP address of the node A, "IP dst" represents an IP address of the controller, and "IP proto" represents 1. The packet generation action causes the network apparatus A to generate and transmit an ARP response packet in the frame format illustrated in FIGS. 3 and 4 (step S104 in FIG. 6). For example, as illustrated in FIG. 4, the controller 10 generates a proxy-response flow entry that causes the network apparatus A to create an ARP response packet in which "Ether src" represents a MAC address of the controller, "IP src" represents the IP address of the controller, "Ether dst" represents the MAC address of the node A, and "IP dst" represents the IP address of the node A.

The network apparatus control unit 12 transmits the proxy-response flow entry generated in step S104 in FIG. 6 to the network apparatus 20A (step S105 in FIG. 6; (s1) SET PROXY RESPONSE FLOW ENTRY in FIG. 5).

The packet reception unit 212 of the network apparatus 20A receives the proxy-response flow entry from the controller 10. The flow table management unit 23 adds the proxy-response flow entry to the flow table 22 and updates the flow table 22 (step S106 in FIG. 6).

Subsequently, the node 30A transmits an ARP request packet in order to resolve the MAC address of the controller 10 (step S107 in FIG. 6). In this ARP request packet, the MAC address of the node A is set in "Ether src", 0x0806 is set in "Ether type", the IP address of the node A is set in "Ip src", the IP address of the controller is set in "Ip dst", and 1 is set in "IP proto".

The packet reception unit 212 of the network apparatus 20A receives the packet from the node 30A ((s2) RECEIVE PACKET in FIG. 5). The packet analysis unit 213 analyzes the packet and searches for a flow entry having matching conditions that match the packet header in which "Ether src" represents the MAC address of the node A, "Ether type" represents 0x0806, "IP src" represents the IP address of the node A, "IP dst" represents the IP address of the controller, and "IP proto" represents 1. In this case, the proxy-response flow entry added to the flow table 22 in step S106 is matched. The packet generation unit 214 generates an ARP response packet in the frame format in FIGS. 3 and 4 in accordance with the action in the instruction field of the proxy-response flow entry (step S108 in FIG. 6; (s3) GENERATE PROXY RESPONSE PACKET in FIG. 5).

The packet transmission unit 211 transmits the generated ARP response packet to the node 30A in accordance with the action in the proxy-response flow entry (step S109 in FIG. 6; (s4) TRANSMIT PACKET in FIG. 5).

As described above, according to the present exemplary embodiment, since the network apparatus 20A transmits the response packet in place of the controller 10, the load on the controller 10 and the secure channel is reduced. As a result, the processing efficiency of the controller is improved.

In addition, the present exemplary embodiment effectively functions even if the controller cannot temporarily respond during updating of software of the controller 10. In addition, to prevent the controller from being a single point of failure, there are cases where a plurality of controllers are used to form a cluster system. In such cases, too, the present exemplary embodiment effectively functions when cluster change is performed. Namely, when the controller 10 cannot respond, even if communication from the nodes 30A and 30B to the controller 10 occurs, the network apparatuses 20A and 20B respond to packets addressed to the controller 10. Thus, suspension of the communication from the nodes 30A and 30B can be suppressed.

[Second Exemplary Embodiment]

Next, a second exemplary embodiment of the present invention will be described in detail with reference to the drawings. The second exemplary embodiment of the present invention can be realized with the same configuration as that of the first exemplary embodiment. Thus, the following description will be made with a focus on differences.

Figure 7:
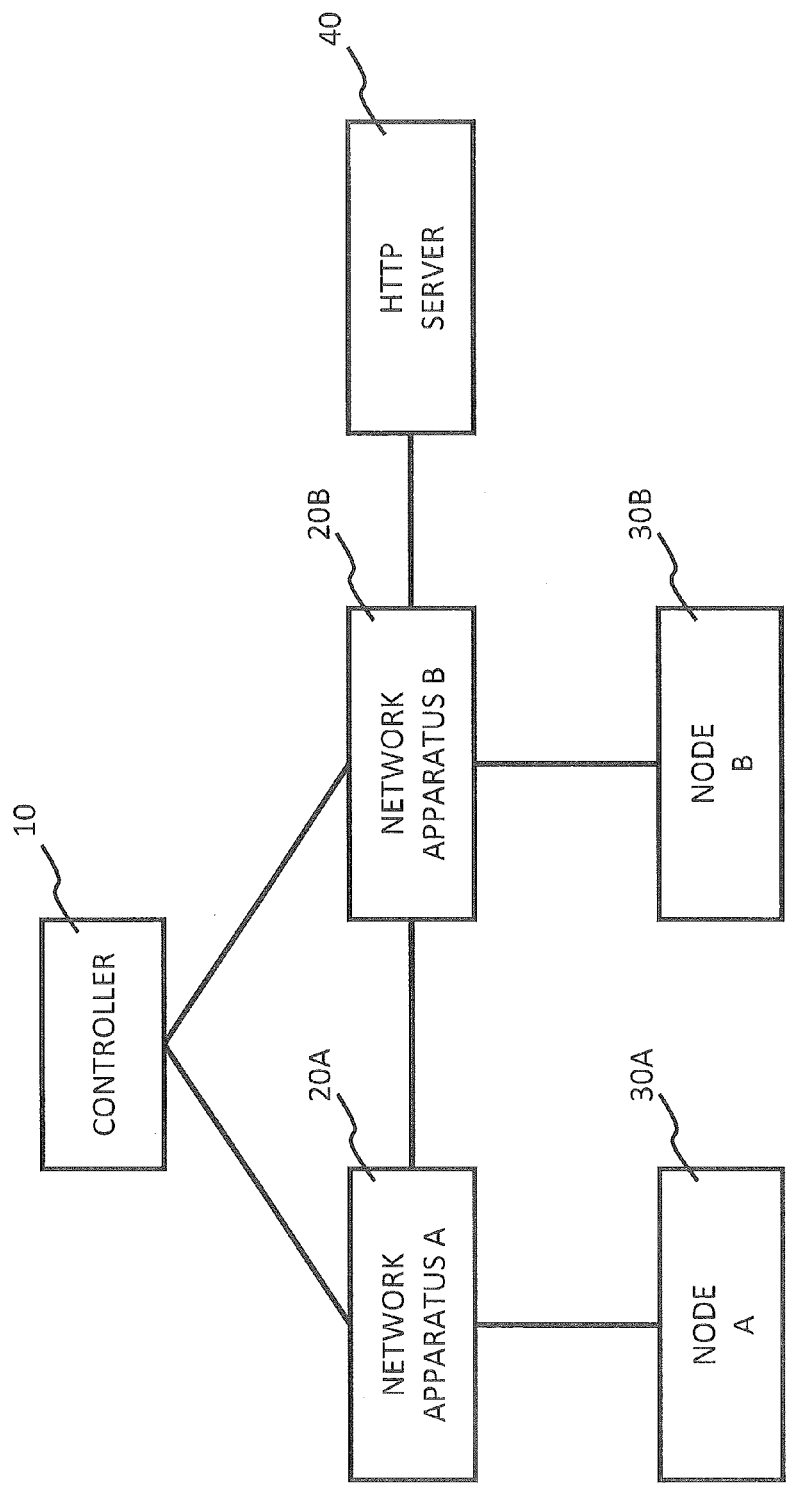
FIG. 7 illustrates a network configuration of a communication system according to a second exemplary embodiment of the present invention.

FIG. 7 illustrates a network configuration of a communication system according to the second exemplary embodiment of the present invention. This network configuration differs from that illustrated in FIG. 5 in that an HTTP (Hyper Text Transfer Protocol) server 40 is connected to the network apparatus 20B. The controller 10, the network apparatuses 20A and 20B, and the nodes 30A and 30B are the same as those of the first exemplary embodiment.

In the present exemplary embodiment, the controller 10 detects that the load on the HTTP server 40 is heavy due to a concentration of HTTP requests to the HTTP server 40. For example, the controller 10 can determine whether HTTP requests to the HTTP server 40 are concentrated or not, by acquiring flow statistical information in a flow entry set in the network apparatus 20B and the like (see "4.5 Counters" on page 10 in Non-Patent Literature 2).

Figure 8:
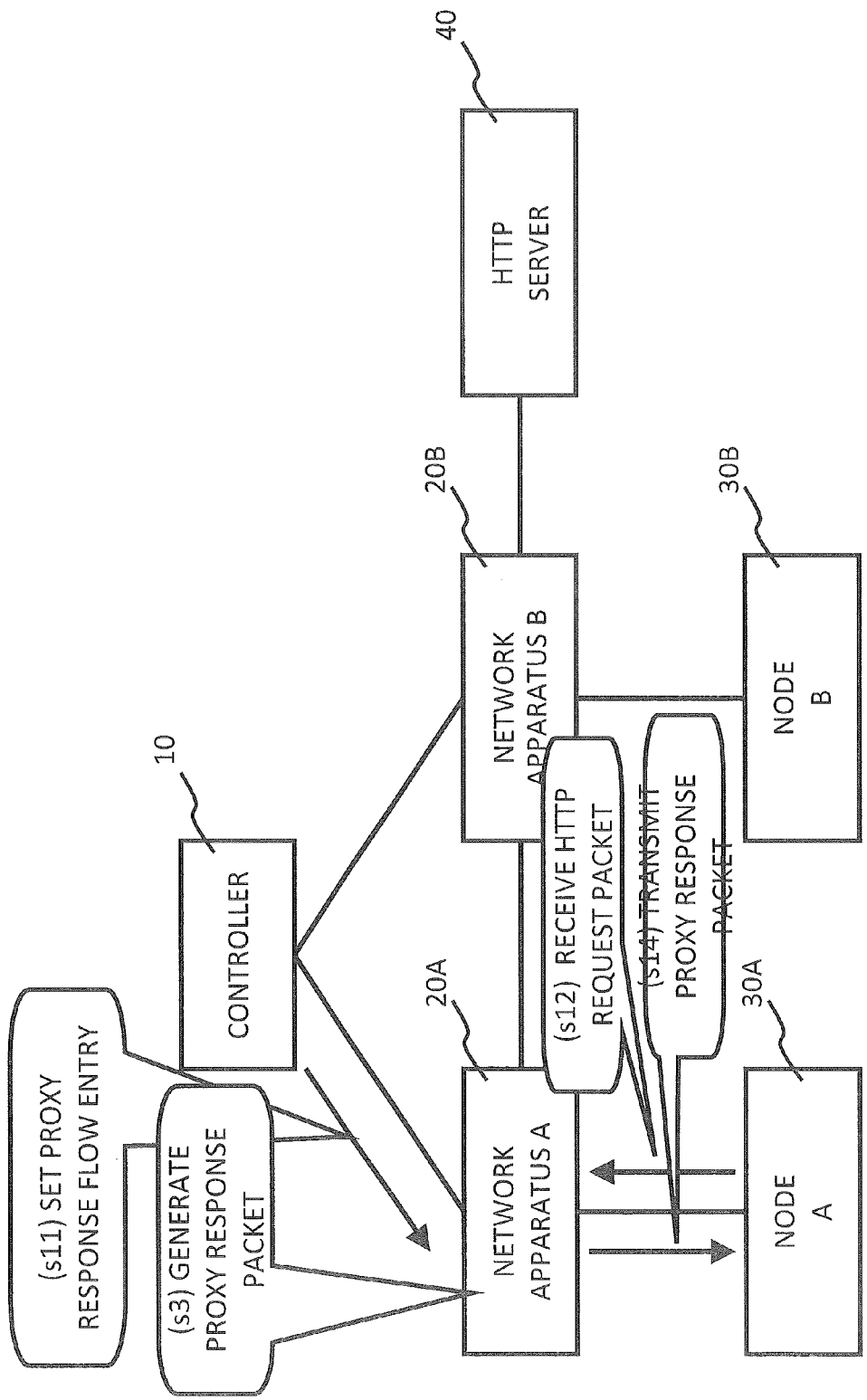
FIG. 8 illustrates a processing flow in the communication system according to the second exemplary embodiment of the present invention.
Figure 9:
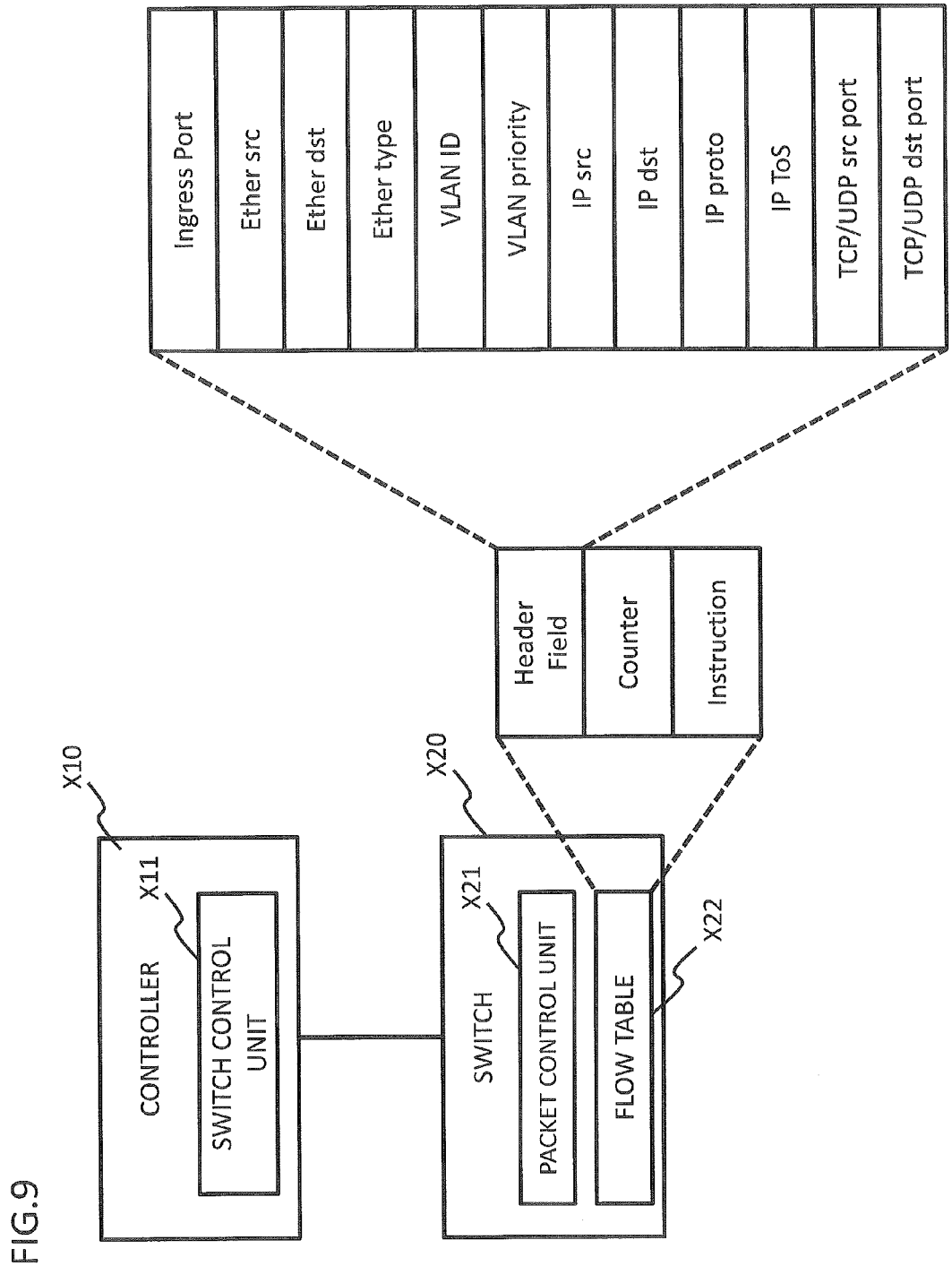
FIG. 9 is a conceptual diagram illustrating a basic configuration in an OpenFlow network according to Non-Patent Literatures 1 and 2.
Figure 11:
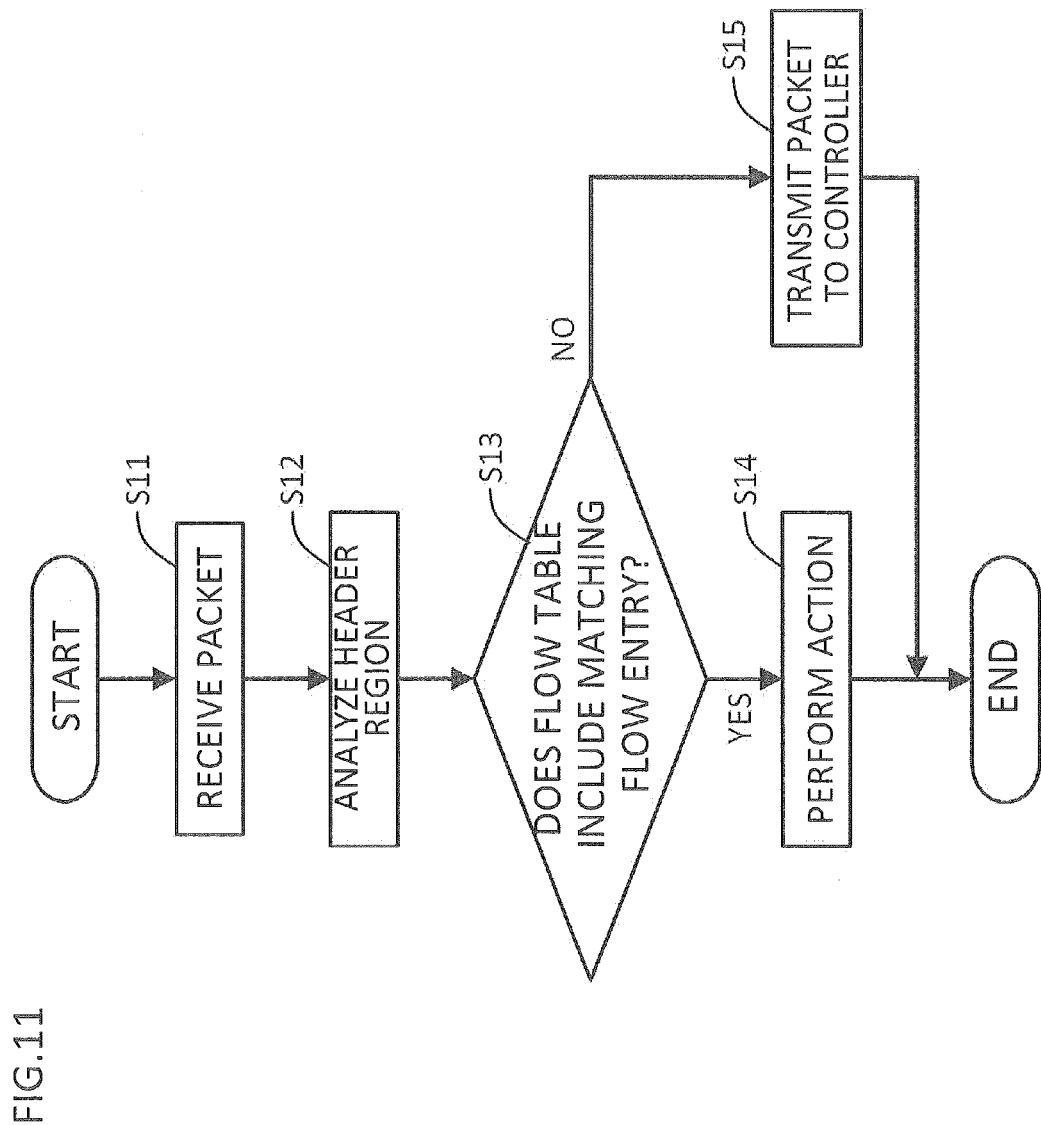
FIG. 11 illustrates a basic operation of an OpenFlow switch according to Non-Patent Literatures 1 and 2.
Figure 12:
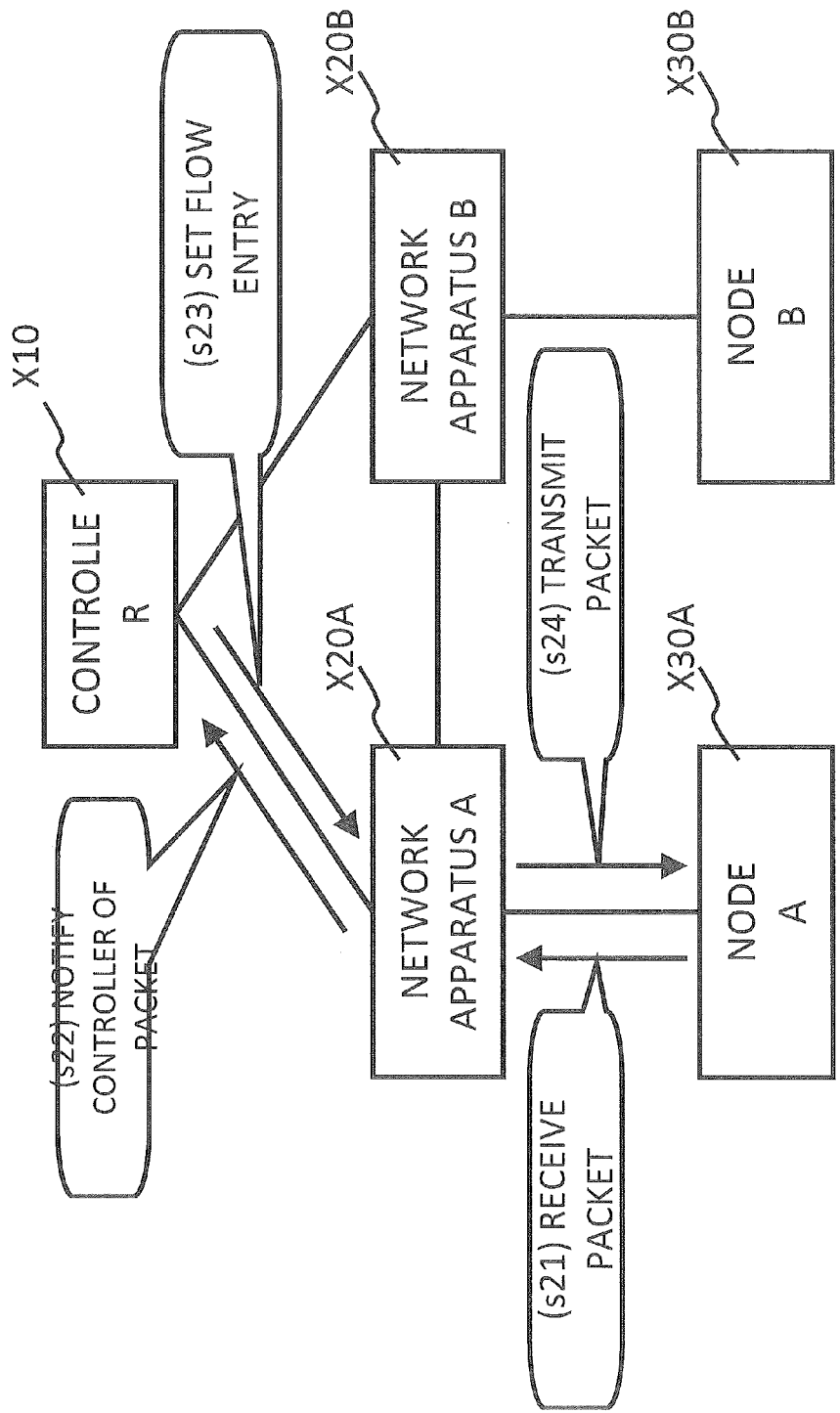
FIG. 12 illustrates a processing flow in the OpenFlow network according to Non-Patent Literatures 1 and 2.

If the controller 10 detects that the load on the HTTP server 40 is heavy, as illustrated in FIG. 8, the controller 10 sets a proxy-response flow entry in the network apparatus 20A. This proxy-response flow entry causes the network apparatus 20A to generate a response packet for an HTTP request packet addressed to the HTTP server 40 from the node 30A and to transmit the response packet to the node 30A. The response packet may be a packet in which an HTTP status code representing an error to the HTTP request packet is set.

In this way, the number of packets flowing on the path from the node 30A to the HTTP server 40 can be suppressed and the load on the HTTP server 40 can be reduced.

In the above example, the network apparatus 20A generates a response to an HTTP request packet addressed to the HTTP server 40. However, a proxy-response flow entry for causing the network apparatuses 20A and 20B to generate and transmit a response packet for packets suspected as Dos (Deny of Service) attack can be set in the network apparatuses 20A and 20B. In this way, too, the same advantageous effects can be obtained.

While exemplary embodiments of the present invention have thus been described, the present invention is not limited thereto. Further variations, substitutions, and adjustments can be made without departing from the basic technical concept of the present invention. For example, while the network apparatuses 20 are illustrated as control targets in the above exemplary embodiments, the present invention is not limited to such example. For example, the proxy-response flow entry can be set in a communication apparatus, such as a mobile phone terminal, a smartphone, a tablet terminal, a personal computer, a game machine, and a mobile router, that stores the above flow entries and that processes received packets or packets from an installed application in accordance with the flow entries. In this way, for example, it is possible to obtain a configuration in which a packet processing unit in these apparatuses transmits a response packet to peripheral apparatuses, installed applications, and the like.

In addition, the above exemplary embodiments have been described based on an example in which a single node is connected to each network apparatus. However, the present invention can also be applied to a configuration in which a plurality of nodes are connected to a single network apparatus. In this case, a node (a packet destination) can be determined by causing the controller 10 to set a flow entry, in which "Ether src" and "IP src" in the header field (matching conditions) represent a MAC address and an IP address of each node, in the network apparatus 20.

The disclosure of each of the above Patent Literatures and Non-Patent Literatures is incorporated herein by reference thereto. Modifications and adjustments of the exemplary embodiments and examples are possible within the scope of the overall disclosure (including the claims) of the present invention and based on the basic technical concept of the present invention. Various combinations and selections of various disclosed elements (including each element in each claim, exemplary embodiment, example, drawing, etc.) are possible within the scope of the claims of the present invention. Namely, the present invention of course includes various variations and modifications that could be made by those skilled in the art according to the overall disclosure including the claims and the technical concept.

10 controller
11 flow entry generation unit
12 network apparatus control unit
13 packet analysis unit
14 address information storage unit
20, 20A, 20B network apparatus
20 network apparatus
21 packet processing unit
22 flow table
23 flow table management unit
30A, 30B, 300 node
40 HTTP server
100 control apparatus
110 control information generation unit
120 communication apparatus control unit
200 communication apparatus
211 packet transmission unit
212 packet reception unit
213 packet analysis unit
214 packet generation unit

The invention claimed is:

1. A control apparatus, comprising:
a control information generation unit generating control information to be set in a communication apparatus(es) that processes received packets in accordance with the control information;
a communication apparatus control unit setting the generated control information in the communication apparatus(es);
an address information storage unit storing information about addresses of nodes on a network; and
a packet analysis unit acquiring the information about addresses of nodes from received packets and registering the information in the address information storage unit,
wherein, when the communication apparatus(es) receives a certain packet, the control apparatus sets packet-generation control information in the communication apparatus(es), the packet-generation control information defining a processing content(s) for causing the communication apparatus(es) to generate a packet for the certain packet and to transmit the packet to a specified destination, and
wherein the control information generation unit generates the packet-generation control information based on the information about addresses of nodes that the address information storage unit stores, wherein the information about addresses of nodes has been acquired from the received packets.

2. The control apparatus according to claim 1,
wherein, as the-packet-generation control information, the control apparatus sets control information for causing the communication apparatus(es) to transmit a response packet for an address resolution request packet in the communication apparatus(es).

3. The control apparatus according to claim 1, wherein information about an address of a source is set in a matching condition used for determining the certain packet in the packet-generation control information, and the control apparatus causes the communication apparatus(es) to determine the source.

4. The control apparatus according to claim 1, wherein, as the packet-generation control information, the control apparatus sets control information for causing the communication apparatus(es) to transmit a response packet for a data request packet addressed to a predetermined server in the communication apparatus(es).

5. A communication apparatus, connected to a control apparatus(es) comprising a control information generation unit generating control information to be set in the communication apparatus, a communication apparatus control unit setting the generated control information in the communication apparatus and setting packet-generation control information in the communication apparatus, an address information storage unit storing information about addresses of nodes on a network, and a packet analysis unit acquiring teh information about addresses of nodes from received packets and registering the information oin the address information storage unit,
 the packet-generation control information defining a processing content(s) for causing the communication apparatus, upon receiving a certain packet, to generate a packet for the certain packet and to transmit the packet to a specified destination, and
 generating and transmitting a packet in accordance with the packet-generation control information set by the control apparatus(es),
 wherein the control information generation unit generates the packet-generation control information based on the information about addresses of nodes that the address information storage unit stores, wherein the information about addresses of nodes has been acquired from the received packets.

6. A communication system, comprising:
 a control apparatus(es) comprising a control information generation unit generating control information to be set in a communication apparatus(es) that processes received packets in accordance with the control information, a communication apparatus control unit setting the generated control information in the communication apparatus(es) and setting packet-generation control information in the communication apparatus(es), an address information storage unit storing information about addresses of nodes on a network, and a packet analysis unit acquiring the informant about addresses of nodes from received packets and registering the information in the address information storage unit, the packet-generation control information defining a processing content(s) for causing the communication apparatus(es), upon receiving a certain packet, to generate a packet for the certain packet and to transmit the packet to a specified destination; and
 a communication apparatus(es) generating and transmitting a packet in accordance with the packet-generation control information set by the control apparatus(es),
 wherein the control information generation unit generates the packet-generation control information based on the information about addresses of nodes that the address information storage unit stores, wherein the information about addresses of nodes has been acquired from the received packets.

7. A communication method, comprising:
causing a control apparatus(es), comprising: a control information generation unit generating control information to be set in a communication apparatus(es) that processes received packets in accordance with the control information; and a communication apparatus control unit setting the generated control information in the communication apparatus(es), to set packet-generation control information in the communication apparatus(es), and an address information storage unit storing information about addresses of nodes on a network;
acquiring the information about addresses of nodes form received packets and registering that information in the address information storage unit;
generating the packet generation control information based on the information about addresses of nodes that the address information storage unit stores, wherein the information about addresses of nodes has been acquired from the received packets, wherein the packet-generation control information defining a processing content(s) for causing the communication apparatus(es), upon receiving a certain packet, to generate a packet for the certain packet and to transmit the packet to a specified destination; and
causing the control apparatus(es) to cause the communication apparatus(es) to generate and transmit a packet in accordance with the packet-generation control information set by the control apparatus(es).

8. A non-transitory recording medium recording a program, causing a computer, which is mounted on a control apparatus(es) comprising: a control information generation unit generating control information to be set in a communication apparatus(es) that processes received packets in accordance with the control information, a communication apparatus control unit setting the generated control information in the communication apparatus(es), and an information storage unit storing information about addresses of nodes on a network to perform processing for:
 acquiring the information about addresses of nodes from received packets and registering the information in the address information storage unit;
 generating packet-generation control information based on the information about addresses of nodes that the address information storage unit stores, wherein the information about addresses of nodes has been acquired from the received packets,
 wherein the packet-generation control information defining a processing content(s) for causing the communication apparatus(es), upon receiving a certain packet, to generate a packet for the certain packet and to transmit the packet to a specified destination; and
 setting the generated control information in the communication apparatus(es).

* * * * *